United States Patent
Scannell et al.

(10) Patent No.: US 10,661,880 B2
(45) Date of Patent: May 26, 2020

(54) CABLE-FREE AND STRUT-FREE FAIRING FOR SUPPORTING A PERSON

(71) Applicant: Bell Helicopter Textron Inc., Fort Worth, TX (US)

(72) Inventors: Brent Scannell, Quebec (CA); Dinesh Sharma, Montrea (CA)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 350 days.

(21) Appl. No.: 15/684,628

(22) Filed: Aug. 23, 2017

(65) Prior Publication Data

US 2019/0061902 A1    Feb. 28, 2019

(51) Int. Cl.
  *B64C 1/14*      (2006.01)
  *B64D 29/04*     (2006.01)
  *B64C 1/24*      (2006.01)
  *B64D 29/08*     (2006.01)
  *B64C 7/00*      (2006.01)
  *B64C 27/06*     (2006.01)

(52) U.S. Cl.
  CPC .......... *B64C 1/1446* (2013.01); *B64C 1/1415* (2013.01); *B64C 1/1461* (2013.01); *B64C 1/24* (2013.01); *B64C 7/00* (2013.01); *B64C 27/06* (2013.01); *B64D 29/04* (2013.01); *B64D 29/08* (2013.01)

(58) Field of Classification Search
  CPC ... B64C 1/1415; B64C 1/1446; B64C 1/1461; B64C 1/22; B64C 7/00; B64D 29/08
  See application file for complete search history.

(56) References Cited

U.S. PATENT DOCUMENTS

| | | | | |
|---|---|---|---|---|
| 4,910,065 A | * | 3/1990 | McKinney | B29C 67/0044 428/116 |
| 6,126,114 A | * | 10/2000 | Victor | B64C 1/1407 244/118.3 |
| 2017/0259492 A1 | * | 9/2017 | Fleming | B29C 65/48 |

FOREIGN PATENT DOCUMENTS

| | | |
|---|---|---|
| EP | 3050794 B1 | 5/2017 |
| EP | 3446967 A1 | 2/2019 |
| FR | 2174690 A1 | 10/1973 |

OTHER PUBLICATIONS

EPO Examination Report issued in EP Application 17195081.9 dated Sep. 18, 2018, 5 pages.
Anonymous: "Mil Mi-26 Helicopter, human for scale," Jul. 12, 2016 (Jul. 12, 2016), XP055442757, Retrieved from the Internet: URL:https://imgur.com/gallery/LfEljuPZ [retrieved on Jan. 19, 2018] *figure 1*; 2 pages.

(Continued)

*Primary Examiner* — Nicholas McFall
(74) *Attorney, Agent, or Firm* — Patent Capital Group

(57) ABSTRACT

One example of a fairing for a rotorcraft includes a core material, an inner housing on a side of the core material, an outer housing on another side of the core material opposite the inner housing, and a hinge. The hinge is configured to move the fairing between an open position and a closed position. In the open position, the inner housing is configured to receive a foot traffic load while the outer housing is configured to transfer the foot traffic load to a fuselage of the rotorcraft. In the closed position, the inner housing is configured to stow in a compartment of the rotorcraft while the outer housing is configured to provide an outer mold line of the rotorcraft in the closed position.

18 Claims, 6 Drawing Sheets

(56) References Cited

OTHER PUBLICATIONS

EPO Search Report issued in EP Application 17195081.9 dated Mar. 2, 2018, 4 pages.
ZKYT Military News: "Mil Mi-26 Soviet/Russian heavy transport helicopter," Jul. 19, 2017 (Jul. 19, 2017), XP054978048, Retrieved from the Internet: URL:https://www.youtube.com/watch?v=NPkAHMGN4Ts [retrieved on Jan. 19, 2018] *sequences 3min45-4min00*; 1 page.
Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).
Perry, Dominic, "Analysis: Bell 525 Relentless Cutaway and Technical Description", Flight Global, Flight International, Bell Helicopter, Published Nov. 12, 2014. (8 pages).
EPO Examination Report issued in EP Application 17195081.9 dated Mar. 26, 2018, 6 pages.

\* cited by examiner

CABLE-FREE AND STRUT-FREE FAIRING FOR SUPPORTING A PERSON

TECHNICAL FIELD

This disclosure relates generally to aircraft fairings and cowlings, and more particularly, though not exclusively, to cable-free, strut-free, and moveable aircraft fairings and cowlings for supporting a person.

BACKGROUND

An outer mold line (OML) provides an aerodynamic path for air to flow around the aircraft during flight and generally comprises an outer surface of an aircraft. The OML is an aerodynamic outer surface of aircraft that reduces aerodynamic drag. The OML comprises many contiguous surfaces of different components and/or fairings. Fairings and cowlings provide a relatively smooth outer surface that reduces aerodynamic drag experienced by the aircraft. For example, some rotorcrafts include fairing assemblies configured to protect propulsion related components and/or drivetrain components (e.g., driveshaft, gearbox, transmission system, and the like). For example, a fairing may be used for general drag reduction, but also for providing an aerodynamic flow path from the exterior of the fairing assembly to the engine inlet engine as well as for decorative purposes. Fairings and cowlings have, in the past, been constructed of aluminum or other light-weight metals, but are more recently increasingly constructed from composite materials, such as carbon fiber reinforced polymer (CFRP). In some rotorcraft configurations, drivetrain components are arranged in a compartment underneath the fairing. The components in the compartment require access, e.g., for occasional or periodic inspection and maintenance which necessitates at least partial removal of the fairing.

SUMMARY

According to one aspect of the present disclosure, a fairing for a rotorcraft includes a core material, an inner housing on a side of the core material, an outer housing on another side of the core material opposite the inner housing, and a hinge. The hinge is configured to move the fairing between an open position and a closed position. In the open position, the inner housing is configured to receive a foot traffic load while the outer housing is configured to transfer the foot traffic load to a fuselage of the rotorcraft. In the closed position, the inner housing is configured to stow in a compartment of the rotorcraft while the outer housing is configured to provide an outer mold line of the rotorcraft in the closed position.

According to another aspect of the present disclosure, a rotorcraft comprises a fuselage, a fairing door assembly, and a hinge. The fuselage comprises an outer mold line of the rotorcraft. The fairing door assembly comprises a core material, an inner housing on a side of the core material, and an outer housing on another side of the core material opposite the inner housing. The fairing door assembly is configured to enable access to a compartment within the fuselage. The hinge is configured to move the fairing door assembly between an open position and a closed position. The inner housing is configured to receive a foot traffic load in the open position and to stow in the compartment in the closed position. The outer housing is configured to transfer the foot traffic load to the fuselage in the open position and to provide a portion of the outer mold line in the closed position.

DETAILED DESCRIPTION

Figure 1A:
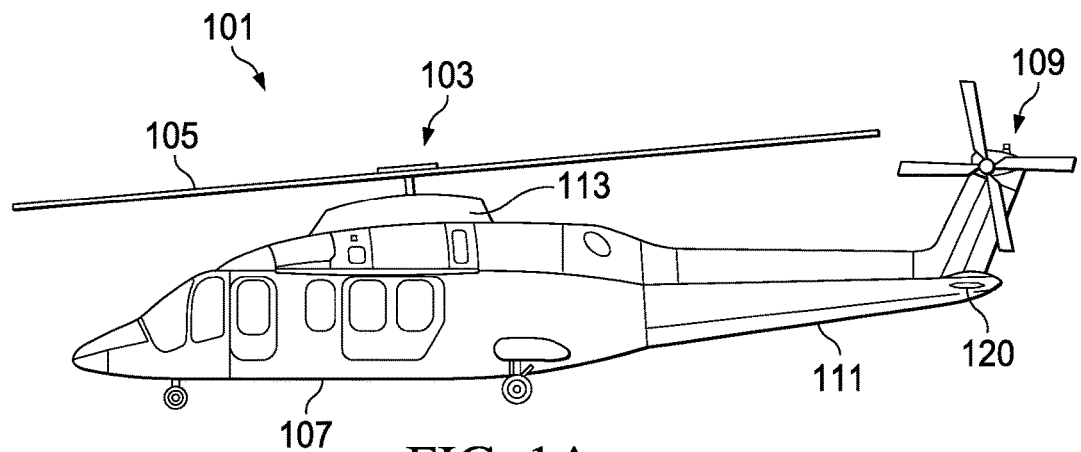
FIGS. 1A and 1B illustrate an example embodiment of a rotorcraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
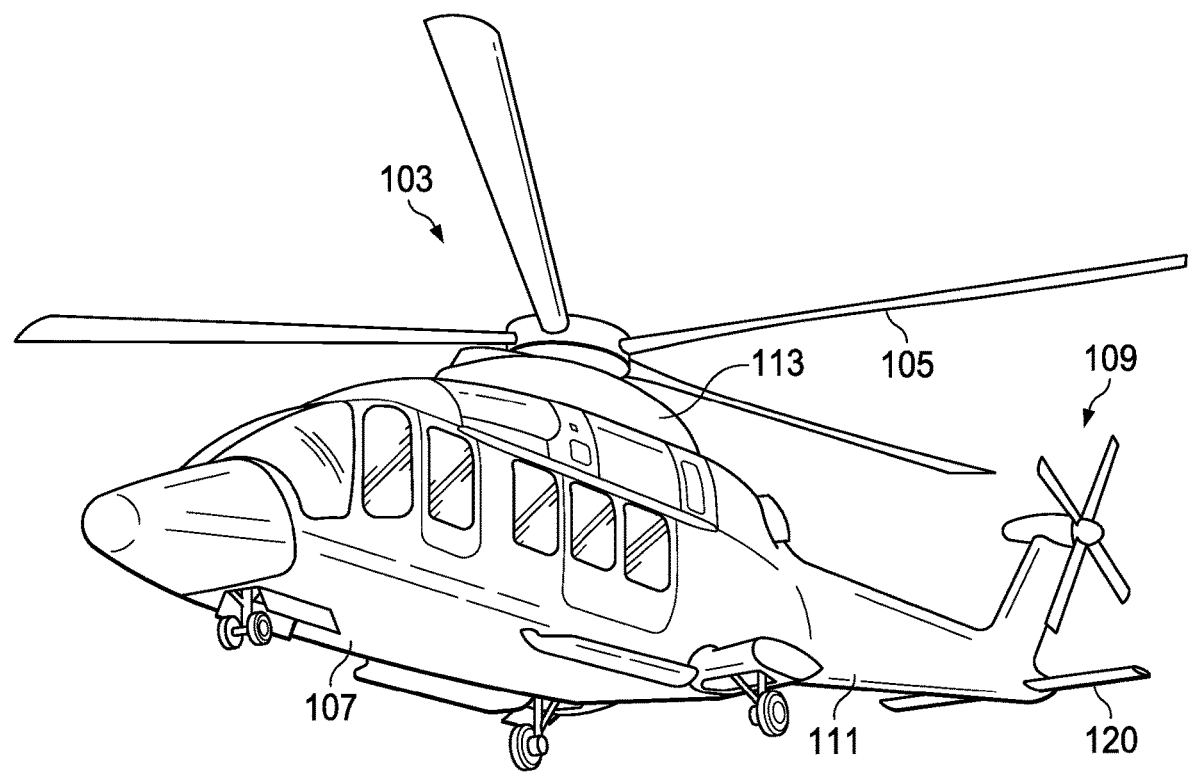

FIGS. 1A and 1B illustrate an example embodiment of a rotorcraft 101. FIG. 1A illustrates a side view of the rotorcraft 101, while FIG. 1B illustrates a perspective view of the rotorcraft 101. Rotorcraft 101 includes a rotor system 103 with a plurality of rotor blades 105. The pitch of each rotor blade 105 can be managed or adjusted in order to selectively control direction, thrust, and lift of the rotorcraft 101. Rotorcraft 101 further includes a fuselage 107, tail rotor or anti-torque system 109, an empennage 111, and a tail structure 120. In the illustrated embodiment, tail structure 120 may be used as a horizontal stabilizer. Torque is supplied to rotor system 103 and anti-torque system 109 using at least one engine. The rotorcraft 101 includes a variety of fairing and/or cowling assemblies configured to cover or protect components of the rotorcraft and reduce aerodynamic drag. One example upper cowling assembly 113 is arranged above an unillustrated engine and may, at least in part, cover and protect, for example, drivetrain components. Fairings and cowlings provide a relatively smooth outer surface that reduces aerodynamic drag experienced by the rotorcraft 101. The terms "cowling" and "fairing" are used interchangeably in the present disclosure.

It should be appreciated that the rotorcraft 101 of FIGS. 1A and 1B are merely illustrative of a variety of aircraft that can be used to implement embodiments of the present disclosure. Other aircraft implementations can include, for example, tiltrotor aircraft, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Some fairings provide access to components in a compartment of a rotorcraft. In many rotorcraft, these fairings open vertically. For example, such fairings open in an upward direction (e.g., a hinge at the top of the fairing allows its bottom edge to swing up) to prevent having loads applied to it (e.g., to prevent people from placing objects on it or standing on it). A strut may be used to support the free edge of the fairing while it is open. Alternatively, the fairings open in a downward direction (e.g., a hinge at the bottom of the fairing allows its top edge to swing down). Commonly, a cable, a chain, or other tension member supports the free edge of the fairing while it is open; however, a strut (or other compression member) may be used to support the free edge of the fairing as an alternative. The supports (i.e., the tension or compression members) also prevent the fairing from over-opening. Although these fairings open downward and, therefore, provide a surface that could potentially support a load, they are often not capable of supporting such loads. Indeed, many of these fairings are conspicuously marked with indicia that indicates that, when the fairing is open, objects should not be placed on the fairing and, in addition, people should not step or stand on them. Such fairings are not a platform for walking, standing, working, or placing objects. Moreover, even if a person were to stand or walk on such a fairing, the supports are a trip hazard that could cause injury to the person. In addition, because these fairings are adjacent to the compartment (i.e., reveal a compartment underneath when open) and obstruct access to the compartment, there is a natural tendency (e.g., for maintenance people) to step on (or otherwise bear some of their weight on) the fairing in order to access the compartment, though doing so is hazardous.

A solution disclosed herein is a cable-free, strut-free, and moveable fairing for supporting a person (e.g., weight of a person, load resulting from foot traffic, and the like).

The embodiments described throughout this disclosure address the above challenges (and others) and provide numerous technical advantages, including simultaneously providing (1) access to a compartment of a rotorcraft and (2) a platform configured to support walking, standing, working, and/or placing objects. Moreover, the access and platform are provided without the use of tension members (e.g., cables or chains) and without the use of compression members (e.g., struts) to support the edges of the fairing. Instead, these supports (i.e., the tension members and the compression members) are replaced by hinges and a bearing surface (bearing on a surface under the fairing in the open position) that create a moment couple to support the foot traffic loads on the fairing. In other words, the combination of the hinges and bearing surface support the entire weight of the fairing and loads applied to the fairing and transfer forces (i.e., the weight and applied loads) to the fuselage. No other points of contact (such as is the case for tension members and compression members) are used to transfer the forces to the fuselage of the aircraft. Removing these supports advantageously eliminates significant trip hazards from the fairing that could cause injury to people who access the compartment by stepping on the fairing. Advantageously, because the fairing can support loads resulting from foot traffic (i.e., foot traffic loads), people can stand/squat on the fairing to access not only the compartment but also other components that are accessibly by standing on the fairing (e.g., overhead objects that are only accessible from the platform when standing). For example, people can squat on the fairing to access a gearbox in the compartment and can also stand on the fairing to access rotors above the fairing. While the rotorcraft may have other (relatively small) maintenance platforms on which a person can stand to access components of the rotorcraft, the surface area of the fairing advantageously provides a larger work area on which to move around (e.g., relative to the other maintenance platforms). Using the larger work area can increase the speed of repairs and maintenance on the rotorcraft.

Example embodiments that may be used to implement cable-free, strut-free, and moveable fairings for supporting a person are described below with more particular reference to the remaining Figures.

Figure 2:
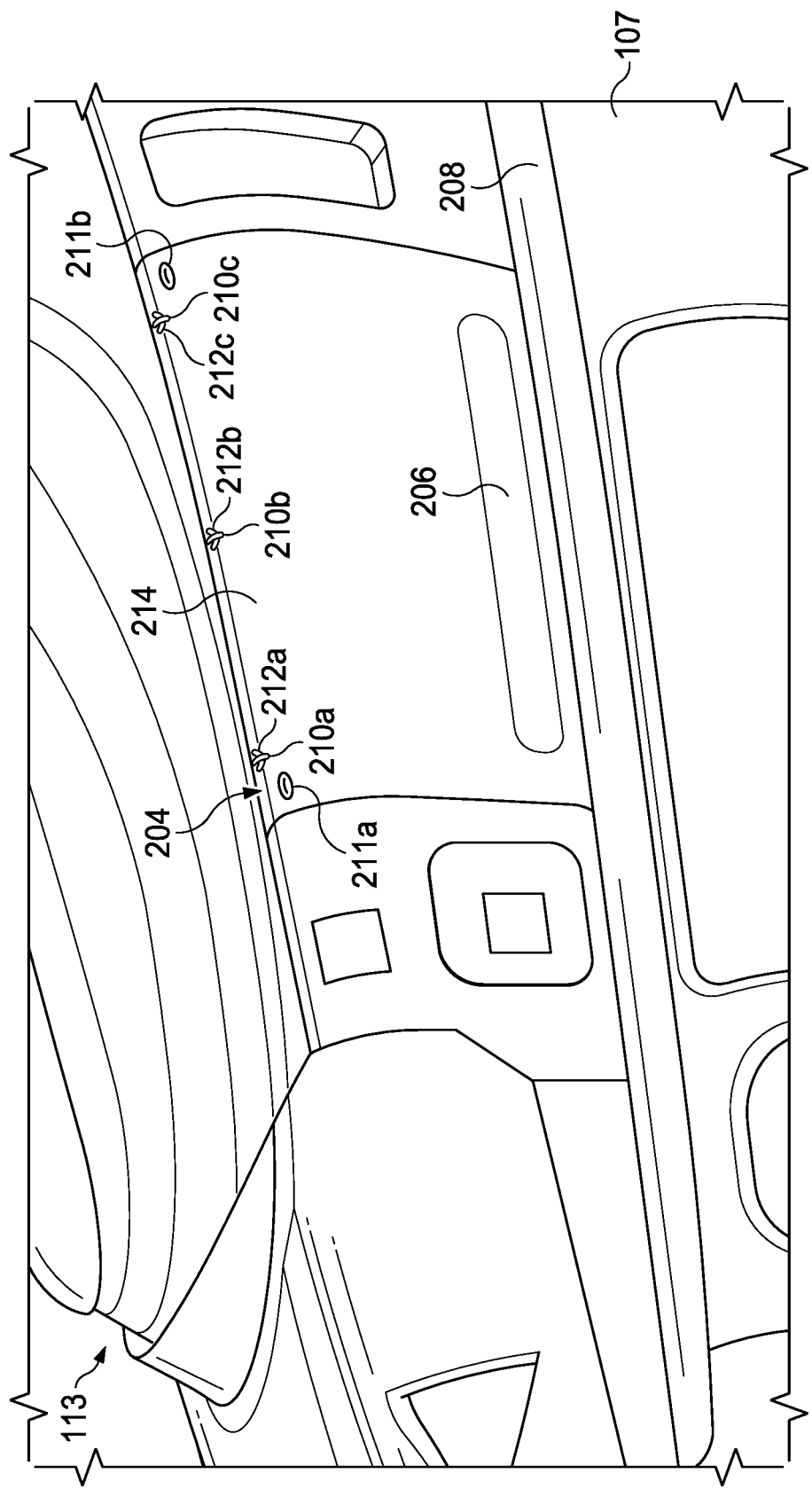
FIG. 2 illustrates an isometric view of an example fairing in a closed position.
Figure 3:
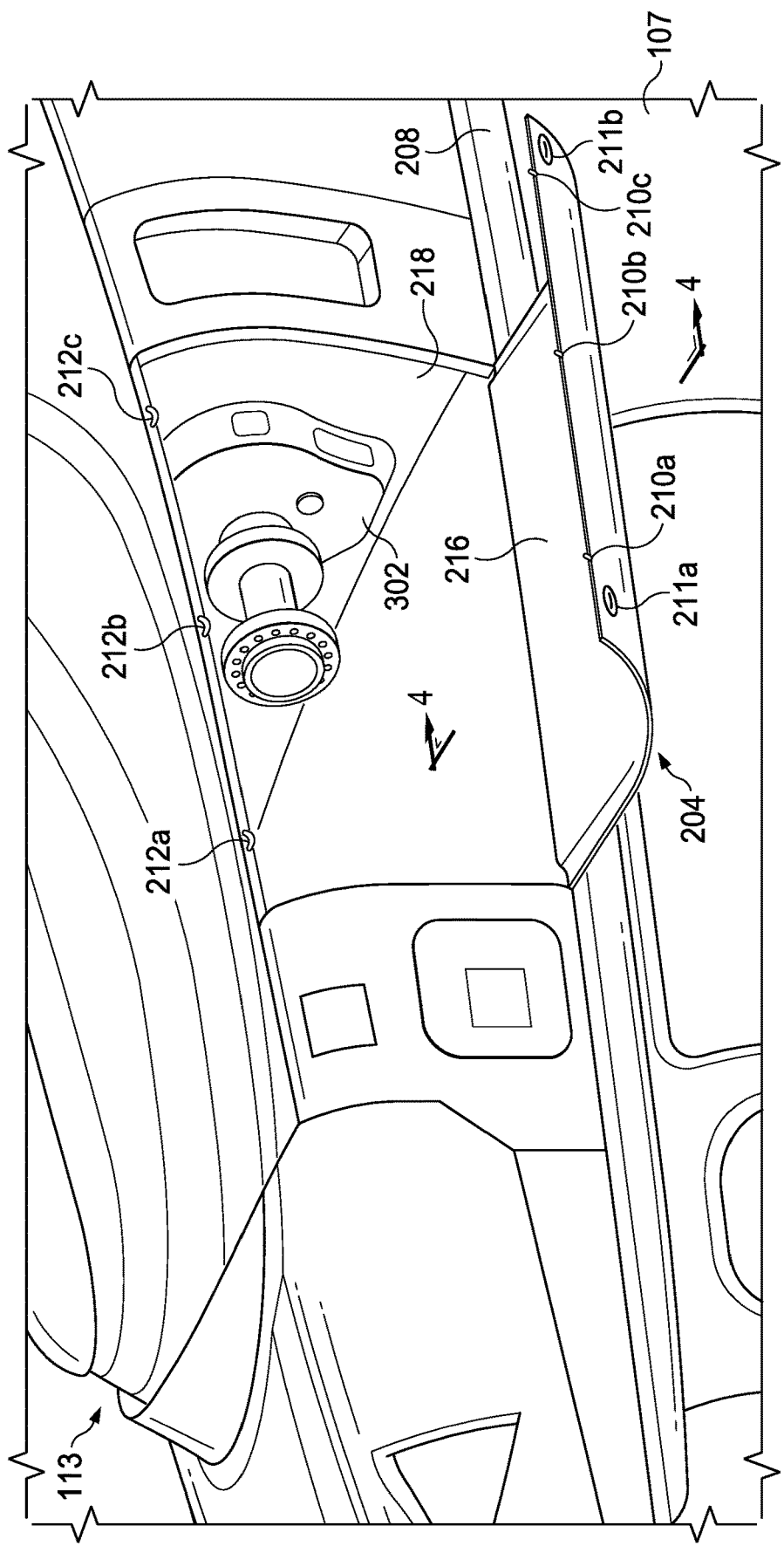
FIG. 3 illustrates an isometric view of the example fairing of FIG. 2 in an open position.
Figure 7:
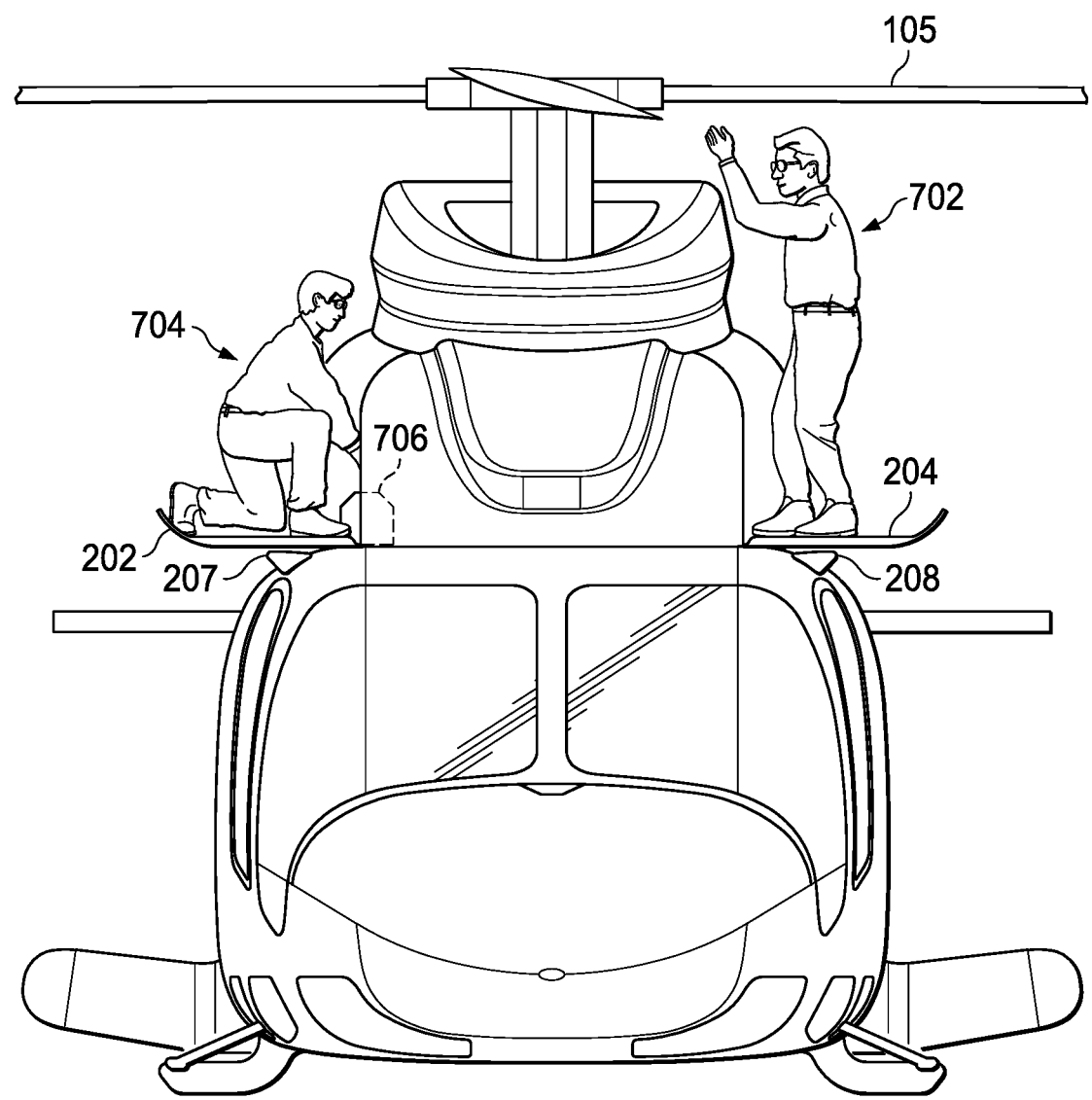
FIG. 7 illustrates a front view of an example rotorcraft having an example fairing on each side of the rotorcraft.

FIGS. 2 and 3 illustrate isometric views of a portion of the rotorcraft 101 below the fairing assembly 113. The rotorcraft 101 comprises, on each of two sides, a maintenance platform and a cable-free, strut-free, and moveable fairing for supporting a person. A maintenance platform 208 is shown in FIGS. 2 and 3. Another maintenance platform 207 (which is illustrated in FIG. 7) is located on an opposite side of the rotorcraft 101. Each of the fairings can operate as a door to selectively enclose or reveal (e.g., based on being in a closed position or in an open position, respectively) a compartment 218 within rotorcraft 101. In this particular example, the compartment 218 encloses a reduction gearbox 302, which provides reduction gearing to a driveshaft assembly. The views depicted in FIGS. 2 and 3, illustrate one of the two example fairings (i.e., example fairing 204). FIG. 2 illustrates the fairing 204 in the closed position. FIG. 3 illustrates the fairing 204 in the open position. Another fairing 202 (which is illustrated in FIG. 7) is located on an opposite side of the rotorcraft 101. It is noted that the two fairings 202 and 204 are substantially similar to one another (e.g., mirrored versions of one another as shown in FIG. 7). Thus, the details described below with respect to the fairing 204 are equally applicable to the fairing 202.

The following description of the fairing 204 is provided with simultaneous reference to FIGS. 2 and 3. In general, the fairing 204 comprises a core material, an inner housing 216, and an outer housing 214. The inner housing 216 is on an inside of the core material. The outer housing 214 is on an outside of the core material, opposite the inner housing 216. A raised portion 206 extends from the outer housing 214. The core material, the inner housing 216, and the outer housing 214, at least in part, define a door, which can selectively enclose or reveal the compartment 218. A hinge pivotally couples the fairing 204 to a fuselage of the rotorcraft and enables the fairing 204 to pivot between the open position and the closed position. A releasable locking mechanism secures the fairing 204 to an adjacent fairing in the closed position. In the example shown in FIGS. 2 and 3, one releasable locking mechanism comprises latching components 212a, 212b, 212c, 210a, 210b, and 210c and another releasable locking mechanism includes trigger latches 211a and 211b. Each of the latching components 210a, 210b, and 210c is affixed to an edge of the fairing 204. Each of the latching components 212a, 212b, and 212c is affixed to an edge of the adjacent fairing. The trigger latch 211a is at a forward edge of the fairing 204 and trigger latch 211b is at an aft edge of the fairing 204. The trigger latches 211a and 211b secure the fairing 204 to the edge of the adjacent fairing and release the fairing 204 when a trigger portion of the latch is pulled.

Now turning to FIG. 2, FIG. 2 illustrates the fairing 204 in the closed position. The fairing 204 encloses the compartment 218 and, therefore, the compartment 218 is hidden from view. In the closed position, the latching components 210a, 210b, and 210c interlock with the latching components 212a, 212b, and 212c, respectively to secure the fairing 204 to the adjacent fairing. The inner housing 216 is stowed in the compartment 218 while the outer housing 214 provides a portion of an outer mold line of the rotorcraft.

Now turning to FIG. 3, FIG. 3 illustrates an isometric view of the example fairing of FIG. 2 in the open position. In the open position, the fairing 204 exposes the compartment 218 and, therefore, provides access to components in the compartment 218 such as the reduction gearbox 302. The latching components 210a, 210b, and 210c are disconnected from the latching components 212a, 212b, and 212c, respectively, to release the fairing 204 from the adjacent fairing. Also, in the open position, the inner housing 216 is configured to receive a foot traffic load in the open position and the outer housing 214 is configured to transfer the foot traffic load to the fuselage of the rotorcraft. In particular, the raised portion 206 is attached to the exposed surface of the outer housing 214. When the fairing 204 is in the open position, the raised portion 206 contacts the maintenance platform 208 and transfers the foot traffic load to the fuselage via the maintenance platform 208 (described further with respect to FIGS. 4, 5, and 6). The inner housing 216 provides a platform for walking, standing, and/or working. For example, maintenance people can work from the fairing 204 to perform maintenance on the rotorcraft. While a person may stand on the maintenance platform 208, the exposed surface of the inner housing 216 provides a larger work area on which to move around (e.g., relative to the maintenance platform 208). Using the larger work area can increase the speed of repairs and maintenance on the rotorcraft.

Figure 4:
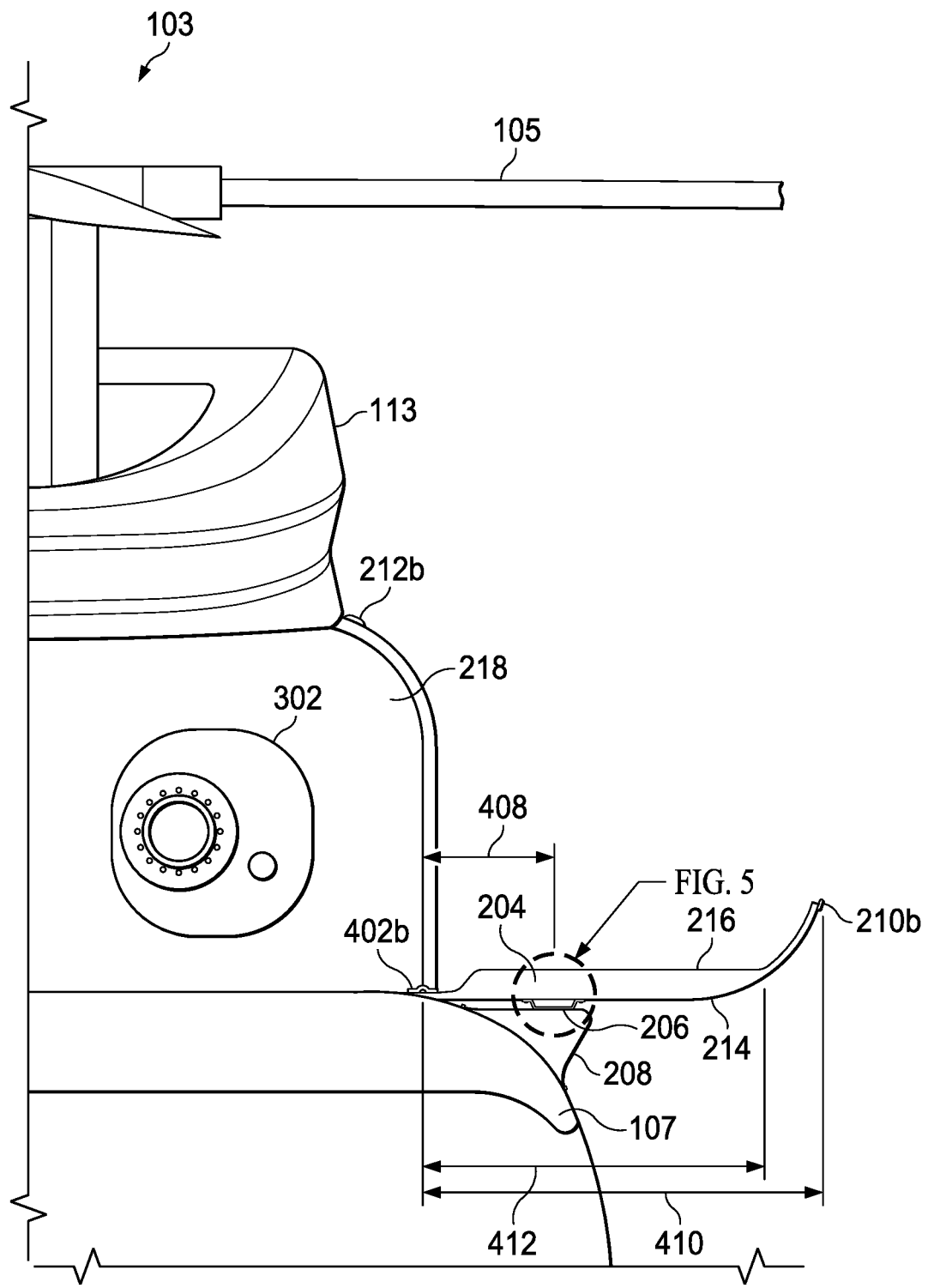
FIG. 4 illustrates a cross section of the example fairing of FIG. 2 in the open position.

FIG. 4 illustrates a cross section of the fairing 204 in the open position of FIG. 3. The cross section of FIG. 4 is cut along a line as generally indicated by the lines labeled "4" in FIG. 3. Many of the components of the fairing 204 and the rotorcraft are described above and are not repeat here only for brevity. The inner housing 216 and the outer housing 214 are offset from one another. In this example, inner housing 216 and the outer housing 214 substantially parallel along a portion of the fairing 204 and curve to contact one another along another portion of the fairing 204. FIG. 4 illustrates that the maintenance platform 208 is attached to the fuselage 107. A hinge 402b is one of multiple hinges that attach the fairing 204 to the fuselage 107. Each of the hinges is configured to move the fairing between the open position (e.g., as depicted in FIG. 3) and the closed position (e.g., as depicted in FIG. 2). The raised portion 206 is attached to the outer housing 214. In addition, the raised portion 206 bears directly on a top surface of the maintenance platform 208 and, thereby, can transfer the foot traffic load from the fairing 204 to the fuselage 107. The raised portion 206 only bears on the maintenance platform 208 when the fairing 204 is in the open position. When the fairing 204 is in the closed position, the raised portion 206 does not contact the maintenance platform 208. Foot traffic loading on the fairing 204 (e.g., when a person steps and/or walks on the inner housing 216 in the open position) causes reaction forces at the hinges and the raised portion 206 bearing on the maintenance platform 208. For example, one reaction force is generated at the hinges (e.g., hinge 402b) and another reaction force is generated at a center of the bearing portion 206. Length 408 is measured between the hinge 402b and the center of the bearing portion 206. These reaction forces form a moment couple (e.g., where the forces are separated by a moment arm distance equal to the length 408) to transfer the foot traffic load to the fuselage 107. This moment couple formed by the hinge and the raised portion 206 support all of the foot traffic load applied to the fairing 204. In other words, only the hinges and the raised portion 206 support the foot traffic load and no other points of contact (i.e., no cables or struts) are used to transfer the foot traffic load to the fuselage 107. Removing supports such as cables and struts advantageously eliminates significant trip hazards from the fairing 204 that could cause injury to people who access the compartment 218 by stepping on the fairing 204. Length 410 is a length of the fairing 204 and is measured between the hinge 402b and a distal edge of the fairing 204 with respect to the fuselage 107. In this example, a ratio of the length 408 to the length 410 is 5 to 1. Length 412 is a length of a work surface of the fairing 204 and is measured between the hinge 402b and a distal edge of a flat top surface of the fairing 204 with respect to the fuselage 107. In addition, the work surface provided by the fairing 204 increases the available area on which a maintenance person can work relative to the maintenance platform 208 by about 3× (e.g., ratio of the length 408 to the length 412 is about 3 to 1).

Figure 5:
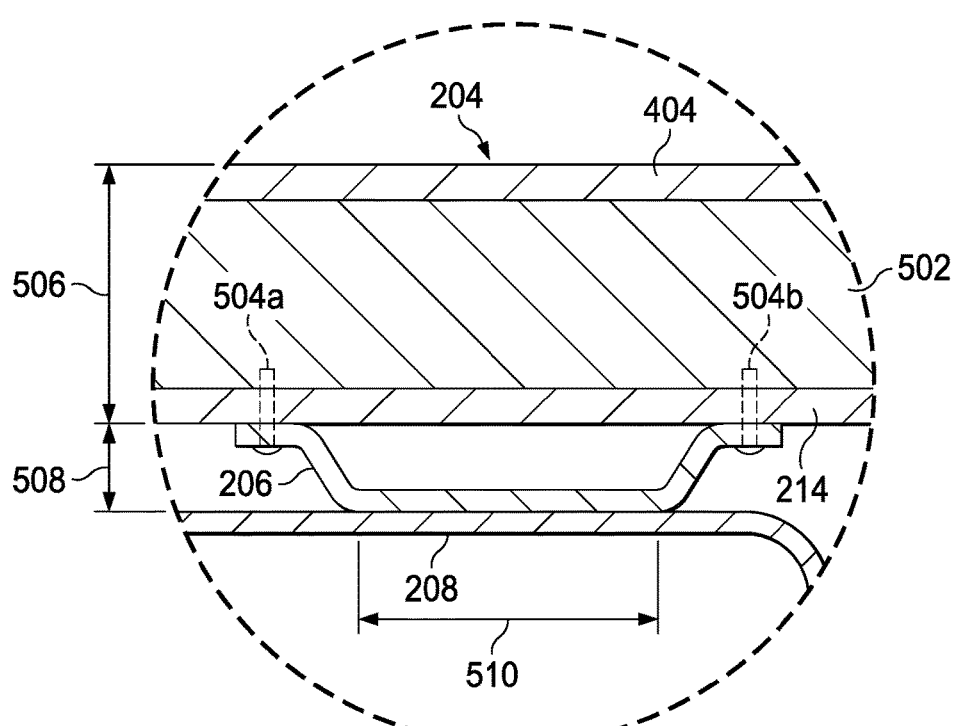
FIG. 5 illustrates a detailed cross section of a portion of the example fairing of FIG. 2.

FIG. 5 illustrates a detailed cross section of a portion of the cross section of FIG. 4. The cross section of FIG. 5 is a detailed view of the portion of the cross section of FIG. 4 as generally indicated by the circle labeled "FIG. 5" in FIG. 4. A thickness 506 is measured between a face of the inner housing 216 and a face of the outer housing 214. A core material 502 contributes to the stiffness of the fairing 204. For example, the core material 502 may comprise a corrugated material, which has high stiffness due to its corrugations. The core material 502 is a different material than the housings (i.e., the inner housing 216 and the outer housing 214). For example, each of the inner housing 216 and the outer housing 214 can comprise carbon fiber reinforced polymer and/or a metal (as is describer further below).

Figure 6:
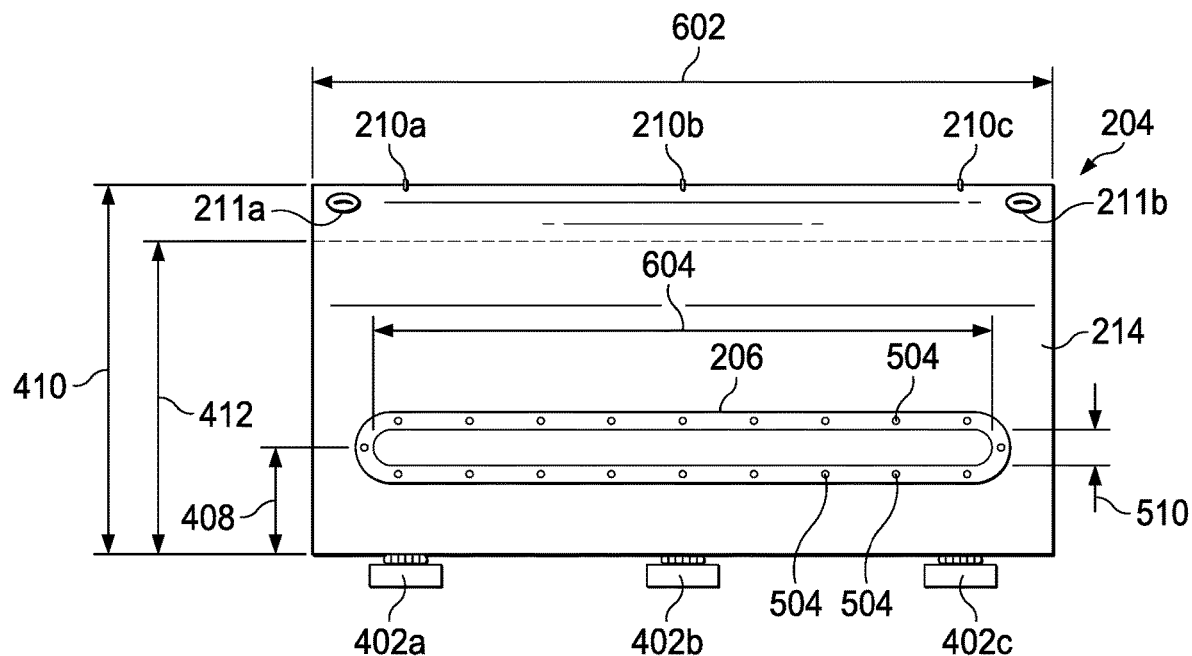
FIG. 6 illustrates a plan view a one side of the example fairing of FIG. 2.

The inner housing 216 is attached to one side of the core material 502. The outer housing 214 is attached to another side of the core material 502 opposite the inner housing 216. The inner housing 216 and the outer housing 214 enclose the core material 502. For example, the fairing 204 may be manufactured using sandwich core construction for ease of manufacturing. In addition, further stiffeners (e.g., beams, spars, ribs, and the like) can be embedded in the core material 502 to further increase the stiffness of the fairing 204. The raised portion 206 is attached to the outer housing 214 by the fasteners 504 (e.g., 504a and 504b). In some embodiments, the raised portion 206 is a planar material that is formed into a raised shape. For example, the raised portion 206 may be sheet metal (e.g., fractions of an inch thick, ⅛ inch) that is formed into the raised shape by a hydroforming process or mechanical press. The raised portion 206 is raised relative to the outer housing 214 by a length 508. Length 510 is a width of an area of contact between the raised portion 206 and the maintenance platform 208. A length of the area of contact between the raised portion 206 and the maintenance platform 208 is illustrated in FIG. 6. The area of contact distributes foot traffic loads across an equivalent area of the maintenance platform 208. In general, increasing the area of contact reduces the stress (e.g., load per unit area) imposed on the maintenance platform 208 (i.e., given a constant loading). Likewise, reducing the area of contact increases the stress imposed on the maintenance platform 208.

Each of the inner housing 216 and the outer housing 214 may be made of a metal, such as steel or aluminum, or a metal alloy, such as an aluminum alloy. Alternatively, the inner housing 216 and the outer housing 214 may be made of a nonmetallic material, such as reinforced plastics and advanced composites (e.g., carbon fiber reinforced polymer (CFRP)). Carbon fiber reinforced polymers have the advantage of high strength-to-weight ratio, modulus (stiffness to density ratio) 3.5 to 5 times that of steel or aluminum, longer life than metals, higher corrosion resistance, tensile strength 4 to 6 times that of steel or aluminum, and greater design flexibility. Furthermore, the bonded construction of composites such as CFRP can reduce the number joints and fasteners for each component, making these components easy to repair. Accordingly, the inner housing 216 and the outer housing 214 being constructed from composites will be lighter and, in spite of the reduced weight, will be stronger than comparable components made from aluminum alloys and other metals.

FIG. 6 illustrates a plan view of an outer side of the fairing 204. The raised portion 206 is attached to the outer surface 214 by a plurality of fasteners 504. Each of the latching components 210a, 210b, and 210c and trigger latches 211a and 211b is affixed to an edge of the fairing 204. Length 410 is the length of the fairing 204. FIG. 6 illustrates the multiple hinges 402a, 402b, and 402c that attach the fairing 204 to the fuselage and move the fairing 204 between the open position and the closed position. The length 602 is a width of the fairing 204. In a particular example, the length 408 is about 5.5 inches on average (e.g., varying between the front and aft ends), the length 410 is about 27.4 inches on average (e.g., varying between the front and aft ends), the length 412 is about 18 inches on average (e.g., varying from about 16.6 inches at the front end to about 19.4 inches at the aft end), the length 602 is about 65 inches, the length 604 is about 55 inches, the length 510 is about 2.6 inches, the length 508 (illustrated in FIG. 5) is about 0.27 inches on average (e.g., varying from about 0.40 inches at the front end to about 0.15 inches at the aft end), and the thickness 506 (illustrated in FIG. 5) is about 2 inches on average (e.g., varying from about 1.9 inches at the front end to about 2.1 inches at the aft end.

FIG. 7 illustrates a front view of an example rotorcraft having an example fairing on each side of the rotorcraft. The fairing 204 rests on the maintenance platform 208. The fairing 202 rests on the maintenance platform 207. Each of the fairings 202 and 204 is a work platform on which a maintenance person can work while the fairings 202 and 204 are in the open position. A foot traffic load applied to each of the fairings 202 and 204 comprises the weight of a person. Each fairing can support a load equal to or greater than the full weight of one or more people stepping on its surface. The load for a person stepping on the fairing may be estimated based on a 200-pound person and multiplied by a safety factor of about 2.0 or 3.0 (e.g., to account for an impulse load (dynamic loading) created by the person actively stepping or walking on the surface). The load is applied in an area estimated based on a size of the person's foot (e.g., 3-inch square area, or 9 in$^2$). For example, using the safety factor of 2.0, the load is 400 pounds in a 3-inch square area, or about 44.4 pounds per square inch (psi). Alternatively, using the safety factor of 3.0, the load is 600 pounds in a 3-inch square area, or about 66.7 psi. Thus, the fairing can, advantageously, support at least 66.7 psi (i.e., applied over any 3-inch square area of its surface) or a 6001b point load (applied at any point on its surface). In this example, the fairing 202 is in the open position, which exposes a compartment in which a person 704 is working and has placed a tool bag 706. The person 704 and the tool bag 706 are a foot traffic load applied to the fairing 202. The fairing 204 is in the open position, which exposes the inner surface upon which a second person 702 stands to access the rotors 105. By standing on the fairing 204, the person 704 applies a foot traffic load to the fairing 204.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A fairing connected to a rotorcraft, the fairing comprising:
   a core material;
   an inner housing on a side of the core material;
   an outer housing on another side of the core material opposite the inner housing;
   a raised portion fixedly mounted to and extending perpendicularly from the outer housing, wherein the raised portion bears directly on top of a surface of a maintenance platform attached to and extending perpendicularly from a fuselage of the rotorcraft;

a hinge configured to move the fairing between an open position and a closed position;

wherein the inner housing is configured to receive a foot traffic load in the open position and to stow in a compartment of the rotorcraft in the closed position; and wherein the outer housing is configured to transfer the foot traffic load to the fuselage of the rotorcraft in the open position via the raised portion and the maintenance platform and to provide a portion of an outer mold line of the rotorcraft in the closed position.

2. The fairing of claim 1, wherein the core material, the inner housing, and the outer housing, at least in part, define a door.

3. The fairing of claim 1, wherein the hinge is configured to attach the fairing to the fuselage.

4. The fairing of claim 3, wherein the hinge and the raised portion are configured to form a moment couple to transfer the foot traffic load to the fuselage.

5. The fairing of claim 4, wherein the moment couple formed by the hinge and the raised portion support all of the foot traffic load;

wherein only the hinge and the raised portion support the foot traffic load.

6. The fairing of claim 1, wherein the fairing is configured to extend out from the fuselage in the open position; and wherein a first length is measured between the hinge and a distal edge of the fairing with respect to the fuselage, a second length is measured between the hinge and a center of the raised portion, and a ratio of the first length to the second length is 5 to 1.

7. The fairing of claim 1, wherein the core material comprises a corrugated material.

8. The fairing of claim 1, wherein the foot traffic load comprises 600 pounds applied at any point on the inner housing of the fairing.

9. The fairing of claim 1, wherein each of the inner housing and the outer housing comprises at least one of carbon fiber reinforced polymer and a metal plate.

10. A rotorcraft comprising:
a fuselage comprising an outer mold line;
a fairing door assembly configured to enable access to a compartment within the fuselage, the fairing door assembly comprising:
a core material;
an inner housing on a side of the core material;
an outer housing on another side of the core material opposite the inner housing;
a raised portion fixedly mounted to and extending perpendicularly from the outer housing, wherein the raised portion bears directly on top of a surface of a maintenance platform attached to and extending perpendicularly from the fuselage of the rotorcraft;
a hinge configured to move the fairing door assembly between an open position and a closed position;
wherein the inner housing is configured to receive a foot traffic load in the open position and to stow in the compartment in the closed position; and
wherein the outer housing is configured to transfer the foot traffic load to the fuselage of the rotorcraft in the open position via the raised portion and the maintenance platform and to provide a portion of an outer mold line of the rotorcraft in the closed position.

11. The rotorcraft of claim 10, wherein the core material, the inner housing, and the outer housing, at least in part, define a door.

12. The rotorcraft of claim 10, wherein the hinge is configured to attach the fairing door assembly to the fuselage.

13. The rotorcraft of claim 12, wherein the hinge and the raised portion are configured to form a moment couple to transfer the foot traffic load to the fuselage.

14. The rotorcraft of claim 13, wherein the moment couple formed by the hinge and the raised portion support all of the foot traffic load;

wherein only the hinge and the raised portion support the foot traffic load.

15. The rotorcraft of claim 10, wherein the fairing door assembly is configured to extend out from the fuselage in the open position; and wherein a first length is measured between the hinge and a distal edge of the fairing with respect to the fuselage, a second length is measured between the hinge and a center of the raised portion, and a ratio of the first length to the second length is 5 to 1.

16. The rotorcraft of claim 10, wherein the core material comprises a corrugated material.

17. The rotorcraft of claim 10, wherein the foot traffic load comprises 600 pounds applied at any point on the inner housing of the fairing door assembly.

18. The rotorcraft of claim 10, wherein each of the inner housing and the outer housing comprises at least one of carbon fiber reinforced polymer and a metal plate.

* * * * *